United States Patent [19]

Gendron et al.

[11] 3,757,926
[45] Sept. 11, 1973

[54] TRANSFER APPARATUS
[75] Inventors: Rober J. Gendron, Bridgeport; Carl Richard Skarin, Saginaw, both of Mich.
[73] Assignee: Baker Perkins Inc., Saginaw, Mich.
[22] Filed: June 29, 1971
[21] Appl. No.: 151,072

[52] U.S. Cl. .................. 198/38, 198/20 T, 198/179
[51] Int. Cl. ........................ B65g 43/00, B65g 47/00
[58] Field of Search .................... 198/20 T, 38, 185, 198/78, 81, 179, 184, 31 AA; 271/74, 64

[56] References Cited
UNITED STATES PATENTS
| | | | |
|---|---|---|---|
| 3,375,917 | 4/1968 | Irving | 198/179 |
| 3,608,895 | 9/1969 | Kalven | 271/74 |
| 3,170,581 | 2/1965 | Temple | 198/179 |
| 3,476,241 | 11/1969 | Ungerer | 271/74 |
| 3,500,999 | 3/1970 | Lippke | 271/74 |

Primary Examiner—Richard E. Aegerter
Attorney—Learman & McCulloch

[57] ABSTRACT

Apparatus for selectively removing or not removing products such as bakery products from a conveyor and transferring those removed to any selected one of a plurality of superposed discharge conveyors including: a multiple chamber, downwardly opening vacuum box positioned above the feed conveyor and connected to a vacuum source, an endless pick-up conveyor covering the opening in the box and having resilient bellows members positioned on its outer face for sealing to the tops of the products on the feed conveyor when vacuum is communicated thereto to lift the products as the belt moves in an endless path of travel, and actuable valve members in the chambers for releasably and selectively blocking communication of certain portions of the chambers, and the bellows members positioned adjacent thereto, with the source of vacuum to selectively lift products from the conveyor and to selectively deposit them on any one of the discharge conveyors.

20 Claims, 7 Drawing Figures

Patented Sept. 11, 1973

INVENTORS
ROGER J. GENDRON
CARL RICHARD SKARIN

BY Learman & McCulloch
ATTORNEYS

Patented Sept. 11, 1973

INVENTORS
ROGER J. GENDRON
CARL RICHARD SKARIN

BY *Kearman & McCulloch*

ATTORNEYS 3,757,926

TRANSFER APPARATUS

FIELD OF THE INVENTION

This invention relates to transfer apparatus for use particularly in a bakery system, and more particularly, to bakery product transfer apparatus including suction and suction control apparatus for selectively lifting bakery products from one level and transferring them to any selected one of a plurality of different levels.

BACKGROUND OF THE INVENTION

In bakeries, it is frequently desirable to selectively transfer bakery products from an infeed conveyor to any selected one of a plurality of discharge conveyors or bakery processing units. For example, in a slicer feed system for bread loaves, it is desirable for a single feed conveyor to feed several slicing machines. In this system, certain of the bread loaves are permitted to remain on the feed conveyor which supplies them to one of the slicing machines while the remainder of the loaves are removed and conveyed to the remaining slicers.

Bakery handling apparatus, employing suction as a primary lifting force, has been provided in the past for depanning bakery products, such as bread loaves and rolls, by lifting the products from the pans in which they were baked. Known vacuum employing depanning apparatus does not, however, discharge to any selected one of several processing units or discharge conveyors at differing levels. This flexibility is important to the successful performance of certain operations to be mentioned.

SUMMARY OF THE INVENTION

Apparatus constructed according to the present invention is provided for selectively removing products from a delivery conveyor and transferring them to any selected one of a plurality of vertically spaced discharge conveyors. Apparatus constructed according to the invention, although vertically adjustable to handle various size products of differing height need not employ pick-off apparatus which must be vertically adjusted to prevent the product from being picked up. The apparatus of the invention employs a downwardly opening suction box mounted a spaced distance above the feed conveyor and communicating with a vacuum source. An endless conveyor is provided and includes suction members supported on the outer face of an endless member which covers the opening of the box for sealing to the tops of the products on the feed conveyor when suction is applied to the suction members. The vacuum box includes baffle plates which are actuable to selectively block selected portions of the box from communicating with the source, so that the suction members which are adjacent these portions of the box will not lift or hold a product.

The present invention may be more readily described by reference to the accompanying drawings in which.

THE DESCRIPTION OF THE PREFERRED EMBODIMENT

Figure 5:
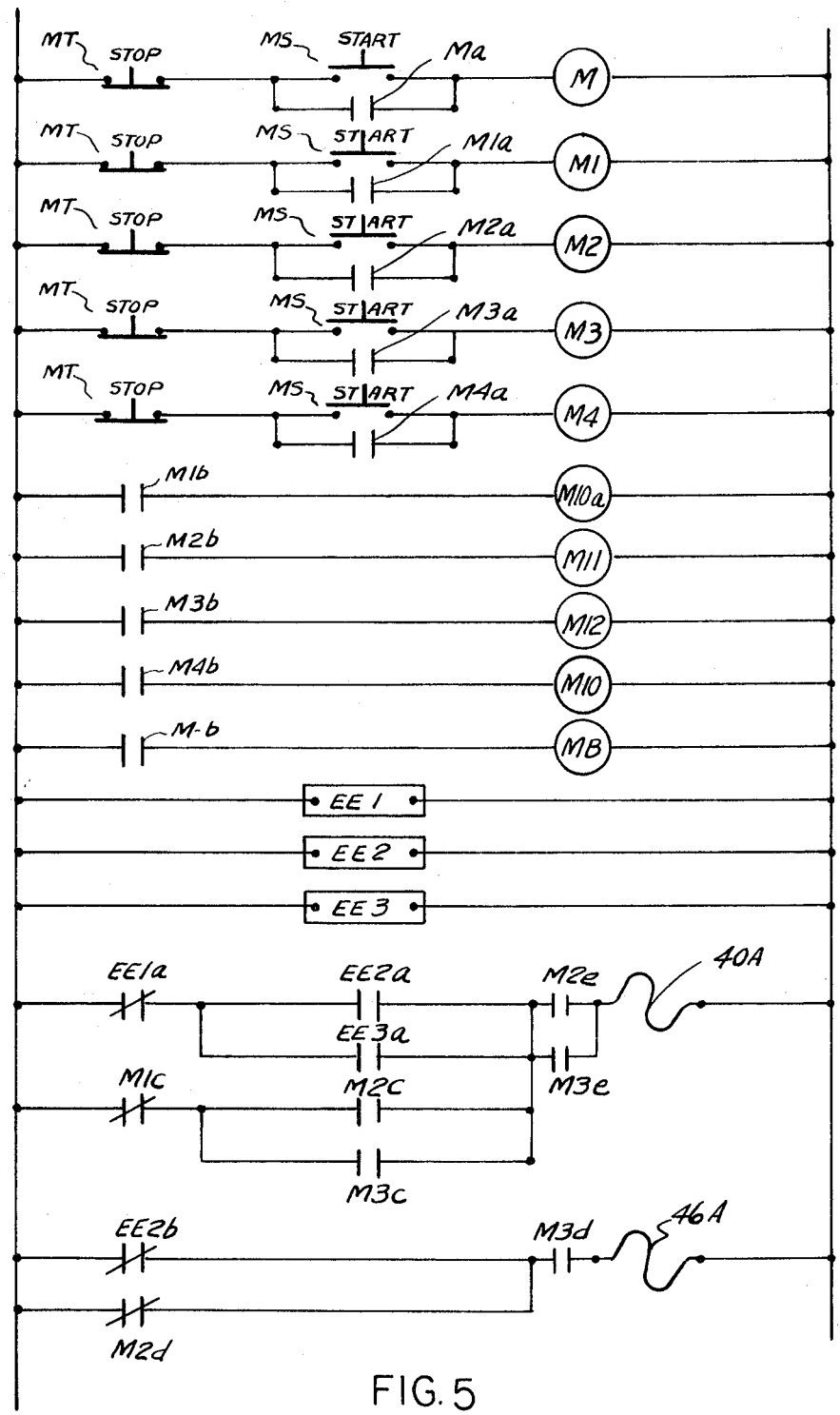
FIG. 5 is a schematic diagram of a typical electrical control circuit for controlling the apparatus illustrated in FIGS. 1 – 4.

Apparatus constructed according to the present invention is particularly adapted for use with a series of stacked, but staggered, endless discharge conveyors, generally designated 10a, 11 and 12. A feed or delivery conveyor 10 for conveying loaves of bread B in a longitudinal path of travel, as represented by the arrow $a$ (FIG. 1), is provided and includes an endless belt 14, trained around a pair of rolls 15, fixed to shafts 15a, journaled by bearings provided on a frame F. The shaft 15a is continuously driven by any suitable power source such as electric motor M–10 (FIG. 5). The endless conveyor 10a is provided as a continuation of conveyor 10 and includes an endless belt 14a trained around front and rear rolls 15b, fixed to shafts 15c, journaled by bearings 15d. Conveyor 10a is driven by motor M–10a.

The endless conveyor 11 is disposed slightly above the conveyor 10 and includes an endless belt 19 trained around a front roll 16 and a reduced diameter rear roll 17. An idler roll 18 is rotatably mounted to provide a vertically inclined upper run portion 19a on which the loaves B are to be deposited. The conveyor 11 is driven by an electric motor M–11.

The endless conveyor 12 is disposed above, and forwardly of, the conveyor 11. The endless conveyor 12 includes an endless belt 13 trained around a front roll 7 and a reduced diameter rear roll 8. An idler roll 9 is mounted to provide a vertically inclined upper run portion 13a on which the bread loaves B shown are to be deposited. The conveyor 12 is driven by an electric motor M–12 (FIG. 5).

The transfer apparatus T, constructed according to the invention, for transferring loaves of bread B from the feed conveyor 10 to the discharge conveyors 11 and 12, as desired, is mounted on a suitable framework F and includes a suction box, generally designated 20, including side walls 21, front and rear end walls 22, and an upper wall 24 spanning the side and end walls. A partitioning wall 26 is provided for dividing the suction box 20 into compartments or chambers 27 and 28.

A vacuum creating suction fan 30 is also provided and includes intake pipes 31 and 32, communicating through one side wall 21 of the vacuum box 20 with chambers 27 and 28 respectively. The members 31 and 32 could be connected to a plenum (not shown) having telescopic connection with the intake of fan 30 to permit the vacuum box 20 to be vertically adjusted by apparatus (not shown) so as to accommodate to bread loaves B of varying heights. The fan 30 is continuously driven by the electric motor MB (FIG. 5) and operates to draw air from the box 20 in the direction represented by the arrows $b$ and release it to a discharge muffler 35.

Figure 1:
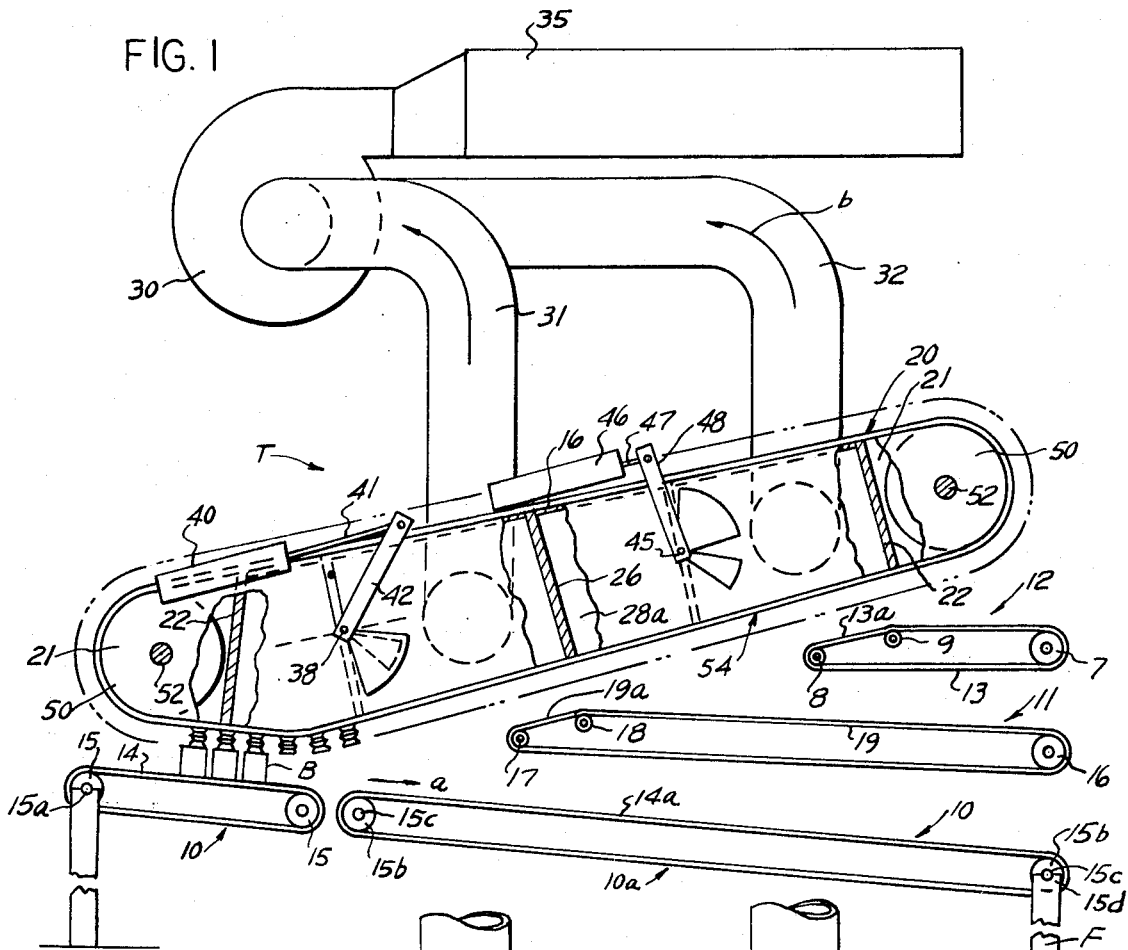
FIG. 1 is a schematic, side elevational view of apparatus constructed according to the present invention, parts of the vacuum box being broken away to illustrate the transverse walls thereof.
Figure 2:
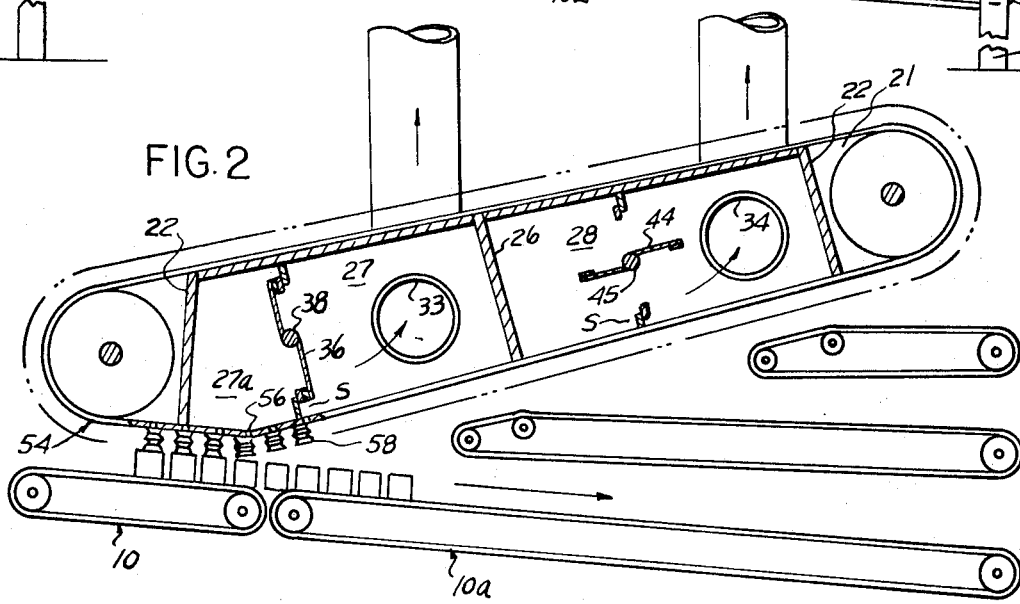
FIG. 2 is a fragmentary, sectional, side elevational view, similar to FIG. 1, and illustrating the adjustable baffles of the vacuum box in adjusted positions in which the baffles will prevent the transfer apparatus from lifting products from the product delivery conveyor.
Figure 3:
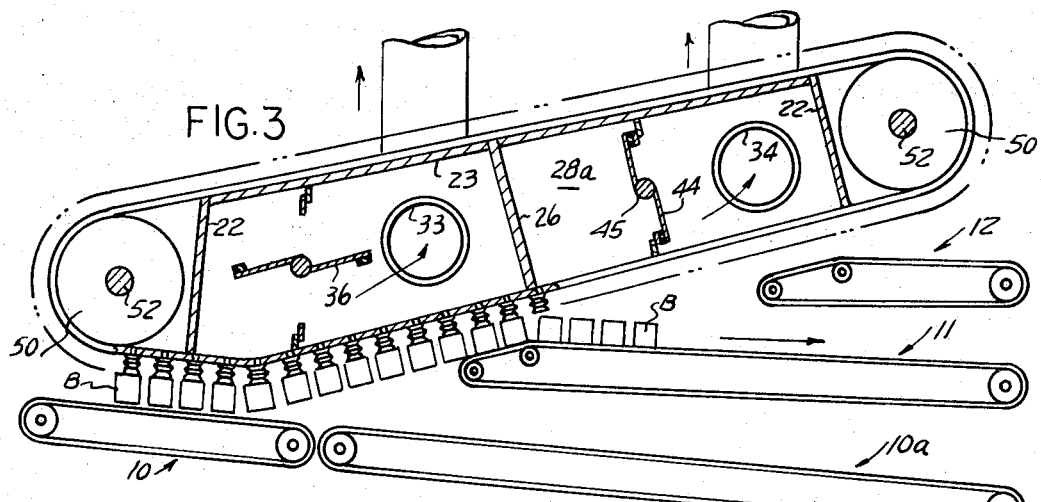
FIG. 3 is a fragmentary, sectional, side elevational view, similar to FIG. 1, and illustrating the adjustable plates of the transfer apparatus in adjusted positions in which the plates permit the transfer apparatus to lift products from the feed conveyor and discharge them onto the immediately superjacent discharge conveyor.
Figure 4:
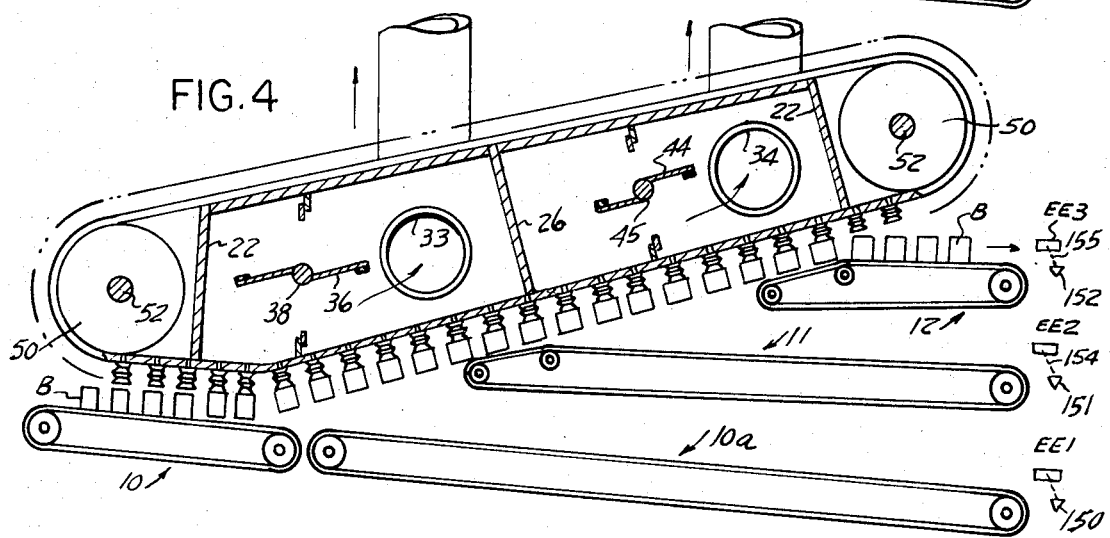
FIG. 4 is a fragmentary sectional, side elevational view, similar to FIG. 1, and illustrating the adjustable plates of the transfer apparatus in adjusted positions in which the plates permit the transfer apparatus to lift products from the feed conveyor and transfer them to the most elevated discharge conveyor.

Intermediate the rear end wall 22 and the partitioning wall 26 is a swingable baffle plate schematically shown at 36 in FIG. 1 as fixed to a shaft 38 journaled by the side walls 21 of the box 20. The baffle plate 36 can be moved from the position shown in FIG. 2 to the position shown in FIG. 3 by a solenoid actuated, fluid operated cylinder 40 having a piston rod 41 connected by a link 42 to the pivotal shaft 38. The cylinder 40 is controlled by a solenoid operated, spring returned valve such that baffle 38 normally is in the down position shown in FIG. 2. When the baffle plate 36 is moved to the position illustrated in FIG. 2, the portion 27a of the chamber 27, is blocked from communicating with the vacuum source 30.

Intermediate the partitioning wall 26 and the front end wall 22 is a swingable baffle plate schematically shown at 44 in FIG. 1 as fixed to a shaft 45 which is journaled by the side walls 21 of the suction box 20. The baffle plate 44 is movable between the open position illustrated in FIG. 2 and the closed position, illustrated in FIG. 3, by a fluid operated cylinder 46, having a piston rod 47 pivotally connected with a link 48 that is fixed to the shaft 45. Cylinder 46 is controlled by a solenoid operated, spring returned valve such that baffle 44 is normally in the down position shown in FIG. 1. When the baffle plate 44 is in the position illustrated in FIG. 3, the portion 28a of the chamber 28 is blocked from communicating with the vacuum source 30. As will be more particularly pointed out during the description of the operation, the position of the baffles 36 and 44 will control whether the bread B is delivered to the conveyor 10a, the conveyor 11 or the conveyor 12. Seal members, only schematically indicated at S in FIGS. 1 – 4, are provided for the baffle plates 38 and 44 and will be later described in detail.

Mounted on a pair of shafts 52, journaled by bearings provided on a vertically movable support frame (not shown) at opposite ends of the suction box 20, are sprockets 50 around which an endless member 54 comprising a pair of endless chains carrying a system of parallel slats on which suction cups 58 are mounted, is trained. The particular construction of the member 54 and suction bellows members 58 is described in United States Letters Patent No. 3,170,581 granted to H. E. Temple on Feb. 23, 1965, which is incorporated herein by reference. One of the shafts 52 is driven by a suitable power source such as the electric motor M–10 (FIG. 5). The endless member 54 has a plurality of apertures or openings 56 therethrough and members 58 are resilient, tubular bread loaf engaging suction members 58 of tubular bellows construction secured to member 54 to communicate with the apertures 56. The members 58 seal to the irregular configuration of the top surfaces of the bread loaves when they are moved into engagement therewith.

Figure 6:
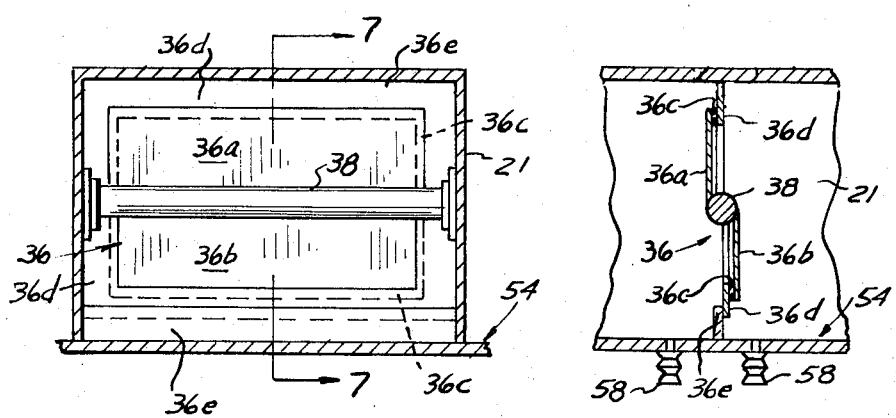
FIG. 6 is an enlarged transverse sectional view taken on the line 6—6 of FIG. 1.
Figure 7:
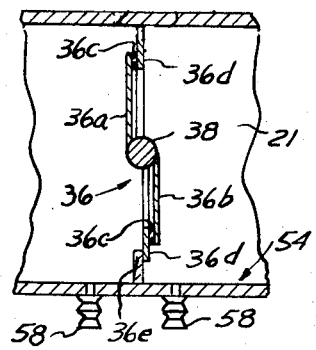
FIG. 7 is a sectional, side elevational view taken on the line 7—7 of FIG. 6.

The members 36 and 44 are identically sealed and a description of baffle 36 (see FIGS. 6 and 7) will suffice to illustrate the construction used. As shown in these Figures baffle 36 comprises plate portions 36a and 36b having perimetrical closed cell resilient plastic seal pads 36c which engage an aperture frame 36d fixed to a frame 36e mounted by the side wall 21 in position to be engaged by endless member 54. Frame 36e is preferably formed of a hard wearing material such as nylon.

THE CONTROL APPARATUS

A schematic diagram showing a typical electrical control circuit, for controlling the apparatus illustrated in FIGS. 1 – 4, is illustrated in FIG. 5 and includes a pair of conductors L1 and L2 connected across a suitable source of electricity such as 110 volt, 60 cycle, alternating current. The motors M10, M10a, M11 and M12 for, respectively, driving the feed conveyor 10 and pick-up conveyor 54, and the discharge conveyors 10a, 11 and 12 are connected in parallel across the lines L1 and L2. Disposed at the discharge ends of the conveyors 10a, 11 and 12 are photoelectric eyes EE1, EE2 and EE3 connected in parallel across the lines L1 and L2. Light sources 150, 151 and 152 are also provided near the discharge ends of the conveyors 10a, 11 and 12 opposite the photoelectric eyes EE1, EE2 and EE3 and respectively transmit light beams 153, 154 and 155 to the eyes EE1, EE2 and EE3. The photoelectric eye EE1 includes a set of contacts EE1a which are closed when the light beam 153 is blocked by a loaf of bread B proceeding on the conveyor 10a indicating that the conveyor 10a has temporarily taken care of the requirements of the apparatus (not shown) positioned downstream. The photoelectric eye EE2 includes a set of contacts EE2a and a set of contacts EE2B which are opened and closed respectively when the beam of light 54 is interrupted by a loaf of bread B proceeding on the conveyor 11 indicating that the conveyor 11 has temporarily taken care of the requirements of the apparatus downstream of it. The contacts EE1a are connected in series circuit relation with the contacts EE2a and the advance solenoid 40A for the valve controlling cylinder 40 which, when energized, directs fluid to the cylinder 40 in such a manner as to move the piston 41 forwardly and swing the baffle plate 36 from the closed position, illustrated in FIG. 2, to the open position, illustrated in FIG. 3. The photoelectric eye EE3 includes a set of contacts EE3a which are connected in parallel with the contacts EE2a and which are opened when the light beam 52 is interrupted by a loaf of bread traveling on the conveyor 12 indicating conveyor 12 does not require more product. The contacts EE2b are connected in series with the advance solenoid 46A for the valve controlling cylinder 46 for directing fluid to the cylinder 46 in such a manner as to move the piston 47 forwardly to swing the baffle plate 44 from the closed position, illustrated in FIG. 3, to the open position illustrated in FIG. 2. Also provided in the circuit shown in FIG. 5, are the starter M for the blower motor MB, the starter M1 for the conveyor motor 10a, the starter M2 for the conveyor 11, and the starter M3 for the conveyor motor M12 and the starter M4 for the motor M10 driving the conveyors 10 and 54. A normally open start switch MS and a normally closed stop switch MT are serially connected with each of the motor starters M, M1, M2, M3 and M4 which respectively include the sets of holding relay contacts Ma, M1a, M2a, M3a, and M4a. Energization of a starter following closure of one of the start switches MS closes the holding contacts which are connected in parallel with the start button and which normally then remain closed until the stop switch MT associated therewith is opened. Auxiliary contacts M$b$, M1$b$, M2$b$, M3$b$ and M4$b$, which are closed when starters M through M4, respectively, are energized, are provided in series circuit relation with the blower motor M$b$, the motor M10$a$, the motor M11, the motor M12, and the motor M10, respectively. The starters M – M3 respectively include motor starter contacts M1$c$, M2$c$, M2$e$, M3$c$, and M3$e$ which are provided in circuit relation with the solenoid 40A controlling the position of the baffle member 36. The contacts M1$c$ are normally closed and open when the motor starter M1 is energized. The contacts M2$c$, M2$e$, and M3$c$ and M3$e$ are normally open and close when the particular starters M2 and M3 are energized. The starters M2 and M3 also include motor starter contacts M2$d$ and M3$d$ which are provided in circuit relation with the solenoid 46A as shown in the print (FIG. 5), which is also initially closed when motor starters M2 and M3 are energized. The contacts M1$c$ – M3$c$, M2$e$ – M3$e$, and M2$d$ and M3$d$ provide an override circuit and prevent the delivery of products to any take-away conveyor 10$a$, 11 or 12 which is not being driven for one reason or another, even though conveyors 10$a$, 11 or 12 may be calling for product, in the sense that beams 50, 51, or 52 are not blocked.

When the photoelectric eye EE1 is not blocked and thus normally contacts EE1A would be open and solenoid 40A would not be energized, these contacts permit the solenoid 40A to be energized if either the conveyor motor M11 or M12 is operating. The contacts M2$e$ and M3$e$ would prevent conveyors 11 and 12 from receiving product, if both of the conveyors 11 and 12 are not running, because these are open when the motors M11 and M12 are not operating and their motor starter circuits are deenergized, even though contacts EE2$a$ and EE3$a$ are closed. When the solenoid 46A normally would not be energized and the baffle 44 could not open to direct bread to conveyor 12, the contacts M2d and M3d provide an override circuit which permits this to happen, as when conveyor 11, although calling for product, is not operating and conveyor 12 is operating.

THE OPERATION

When the beam 150, associated with the electric eye EE1 is transmitted without interruption to indicate that a bakery processing unit downstream thereof demands bread, the contacts EE1$a$ remain open so that the solenoid 40A remains deenergized and the baffle plate 36 remains in the closed position. The chamber portion 27$a$ is thus blocked from communicating with the vacuum source 30, and although the bellows members 56 adjacent the chamber portion 27$a$ are brought into engagement with the tops of the bread loaves B on the conveyor 10, the bread is not picked up because the source of vacuum is blocked. The loaves B simply proceed along the conveyor 10 and on to conveyor 10$a$.

If the eye beam 51 associated with the eye EE2 is transmitted without interruption, it indicates that the apparatus downstream thereof requires product. If products are not required by conveyor 10$a$, (i.e. beam 50 is blocked), the contacts EE1a will close. With beam 51 unblocked and contacts EE2a remaining closed, the solenoid 40A will be energized to swing the baffle plate 36 from the closed position, illustrated in FIG. 2, to the open position, illustrated in FIG. 3 so that vacuum is communicated to chamber portion 27$a$. The contacts EE2B will also remain open, unless beam 51 on conveyor 11 becomes blocked, indicating conveyor 11 does not need product, so that the advance solenoid 46A controlling cylinder 46 will not be energized and thus the baffle plate 44 will remain in the closed position, illustrated in FIG. 3, so that vacuum is not communicated to the chamber portion 28a. When the baffle plate 36 is moved to the open position, vacuum communicates with the bellows members 58 adjacent the chamber portion 27$a$ to pick the bread up from the conveyor 10, but, because the baffle 44 is closed, suction force is no longer applied to the bellows members adjacent the section 28$a$ and the bread drops to the conveyor 11.

If a full complement of bread has been supplied to both the conveyors 10$a$ and 11 so as to interrupt the light beams 50 and 51 associated with the conveyors 10$a$ and 11, and the light beam 52, associated with the eye EE3, is transmitted without interruption, the contacts EE3$a$ remain closed to energize the solenoid 40A so that the baffle plate 36 is moved to the open position. With the contacts EE2$b$ closed and, assuming motor M12 is running and contacts M3$d$ are closed, the advance solenoid 46A is energized to direct fluid to the cylinder 46 in such a manner as to swing the baffle plate 44 to the open position so that vacuum conduit 34 communicates with the chamber portion 28$a$. In this case, the bellows members 58 are maintained in communication with the vacuum created in the suction box 20 along virtually the entire length of the box 20 so that the bread loaves B are conveyed all the way to the conveyor 12. As the bellows members 56 pass the end plate 22 of the suction box 20, vacuum forces are no longer applied via the bellows members 56 and the bread drops onto conveyor 12.

Normally, of course, when a conveyor is not operating, its associated electric eye beam will be blocked and it will be calling for product. The circuit therefore is designed to accomplish certain functions and logic statements relating to the circuit are as follows:

1. If conveyor 10a requires product it has first priority over conveyors 11 and 12.
2. When conveyor 11 requires product, assuming that conveyor 10a does not, conveyor 11 gets priority over conveyor 12.
3. When conveyor 12 requires product, assuming conveyors 10a and 11 do not, conveyor 12 gets the product.
4. If none of the conveyors 10a, 11 or 12 requires product, conveyor 10a gets it regardless.
5. If conveyor 10a is not running and assuming one of the other conveyors 11 or 12 is, it never gets product.
6. If conveyor 11 is not running, it never gets product.
7. If conveyor 12 is not running it never gets product.
8. If no conveyors are running, routing is to conveyor 10a.

It is to be understood that the drawings and descriptive matter are in all cases to be interpreted as merely illustrative of the principles of the invention, rather than as limiting the same in any way, since it is contemplated that various changes may be made in various elements to achieve like results without departing from the spirit of the invention or the scope of the appended claims.

We claim:

1. Transfer apparatus for use in a system having product supplying conveying means for supplying products, such as bread loaves, in a path of travel, and a plurality of discharge conveying means, each vertically spaced from the other and from said supplying conveying means; said apparatus comprising: product supplying conveying means; a plurality of discharge conveying means; suction applying transfer means for selectively lifting or not lifting products from said supplying conveying means and transferring the lifted products to any selected one of said plurality of discharge conveying means; said transfer means including vacuum force applying means for sealing to the upper portions of the products on said supplying conveying means to lift the products from said supplying conveying means and hold them while they are being transferred; said vacuum force applying means comprising endless conveyor means having perforate suction means for gripping the upper portions of the products; means for communicating a source of vacuum along a predetermined length of said endless conveyor means; and vacuum control means for controlling the vacuum forces at the upstream end portion of said endless conveying means to selectively pick up or prevent the pickup of products from said supplying conveying means and for controlling the vacuum forces at the downstream end portion of said endless conveyor means to release the picked up products to any selected one of said discharge conveyors.

2. The transfer apparatus set forth in claim 1 wherein said vacuum force applying means comprises a downwardly opening suction box mounted a spaced distance above said supplying conveying means and open at its lower side; endless conveyor means having a lower run extending along the lower portion of said box and covering said opening in said box, the lower run of said endless conveyor means including perforate suction means communicable with the opening in said box for gripping the upper portions of said products when suction is communicated thereto as the lower run of said endless conveyor means passes under said box; means dividing said suction box into a plurality of longitudinally spaced suction chambers, each being adapted to communicate with a vacuum source; and actuable means selectively movable within said chambers to releasably block communication of longitudinally spaced portions of said chambers with said vacuum source to selectively prevent vacuum from being communicated to the perforate means adjacent said selected chamber portions to selectively lift or not lift the products from said supplying conveying means and to deposit the lifted products on any selected one of said discharge conveying means.

3. The transfer apparatus of claim 2 wherein said actuable means comprises a baffle plate mounted for swinging movement in each of said chambers; and means is provided for swinging said baffle plates between blocking and non-blocking positions.

4. The transfer apparatus set forth in claim 1 wherein said suction applying means comprises a downwardly opening suction box mounted a spaced distance above said supplying conveying means and adapted to communicate with a vacuum source; endless conveyor means having a conveying surface movable along the lower portion of said box and covering the opening in said box; said endless conveyor means having perforate suction means on said conveying surface for gripping the upper portions of products on the supplying conveying means when suction force is communicated thereto by said vacuum box; means dividing said suction box into a plurality of longitudinally space suction chambers and including actuable means for releasably blocking communication of at least certain longitudinally spaced portins of said chambers and the suction means adjacent thereto with said vacuum source to selectively lift or not lift products from said supplying conveying means and to deposit the lifted products on any selected one of said discharge conveying means.

5. The transfer apparatus of claim 4 wherein said endless conveyor means comprises an endless belt and said perforate suction means comprises resilient bellows members connected thereto for sealing to the tops of said products and lifting them from said supplying conveying means when vacuum forces are communicated thereto.

6. Transfer apparatus for use in a system having product supplying conveying means for supplying products, such as bread loaves, in a path of travel, and a plurality of discharge conveying means spaced from each other and from said supplying conveying means; said apparatus comprising: product supplying conveying means; a plurality of discharge conveying means; suction applying transfer means for lifting products from said supplying conveying means and transferring the lifted products to any selected one of said plurality of discharge conveying means; said transfer means including vacuum force applying means for sealing to the upper portions of the products on said supplying conveying means and holding them while they are being transferred; said vacuum force applying means comprising endless conveyor means having perforate suction means for gripping the upper portions of the products; means for communicating a source of vacuum along a predetermined length of said endless conveyor means; and vacuum control means for controlling the vacuum forces at the upstream end portion of said endless conveying means to selectively pick up or prevent the pickup of products from said supplying conveying means and for controlling the vacuum forces at the downstream end portion of said endless conveyor means to release the picked up products to any selected one of said discharge conveyors.

7. The transfer apparatus of claim 6 wherein said transfer means includes:
a vacuum box having an opening in the lower side thereof and communicating with a vacuum source for creating a vacuum force in said box;
conveyor means, including a lower run covering the opening in said box for gripping said products on said supplying conveying means and lifting them when vacuum forces are communicated thereto;
an actuable baffle plate in said box for controlling communication of selected portions of said box at the downstream ends of said conveyor means and said vacuum source to control the vacuum forces in said selected portions and the gripping means positioned adjacent thereto;
means for controlling the position of said baffle plate so that products lifted from said supplying means are delivered to any selected one of said discharge conveyors.

8. The transfer apparatus of claim 6 including a plurality of discharge conveying means which each include a traveling conveyor portion and means for driving said traveling conveying portion; product demand means is provided including means responsive to the presence of a product on one of said discharge conveying means for demanding products from said transfer means; said transfer means being responsive to said demand means for normally supplying products to said one discharge conveying means when product is demanded and supplying products to one of the other discharge conveying means when product is not demanded by said demand means; and override means operative automatically in response to the disabling of the drive means of said one conveying means for overriding said product demand means to cause products to be delivered to one of the other of said discharge conveyor means.

9. A transfer system for a product supplying conveying means for supplying products, such as bread loaves, in a path of travel, and selectively transferring them, comprising: product supplying conveying means; a plurality of generally horizontal longitudinally extending discharge conveyors; a suction box having opening means along one side which spans said product supplying conveying means and discharge conveyors; a suction transfer means traveling along said side and in communication through said opening means with the interior of the box; vacuum source means communicating with said box to exert suction on products engaged by said transfer means; and vacuum segregating means, for selectively blocking portions of the length of the opening means adjacent said discharge conveyors from communication with said vacuum source means, for transferring products selectively from said product supplying conveying means to selected discharge conveyors; said discharge conveyors being generally vertically overlying, and in vertical juxtaposition with said vacuum box; the upstream end of each, proceeding from the penultimate lowermost discharge conveyor to the uppermost, being successively longitudinally inset with respect to the conveyor it overlies and the suction box side with said opening means being upwardly inclined and extending along said discharge conveyors to span them.

10. The combination defined in claim 9 in which the lowermost discharge conveyor constitutes a continuation of the product supplying conveyor.

11. The combination defined in claim 9 in which separate drives are provided for said discharge conveyors; sensing means is provided in conjunction with said discharge conveyors to determine whether product is backing up thereon; and mechanism, controlled by said sensing means, is provided for operating said segregating means to block said vacuum source means such that said suction transfer means transfers product to a discharge conveyor on which products are not backing up.

12. The combination set forth in claim 11 in which said sensing means comprises an electric eye device mounted near each discharge conveyor.

13. The combination defined in claim 9 in which individual drive means is provided for said discharge conveyors; sensing means is provided for sensing when product is backing up on each of said discharge conveyors; and means, controlled by said sensing means, is provided for operating said segregating means to block said vacuum source means to supply products to the discharge conveyors in order of priority from the nearest to the product supplying conveying means to the most remote.

14. The combination defined in claim 13 in which an electrical circuit with a power source is provided and said drives, sensing means, and means for operating said segregating means to block said vacuum source means are connected therein to always supply the lowermost conveyor when product is backing up on all of the other discharge conveyors.

15. The combination set forth in claim 14 in which said drives are so connected in said circuit that, except for the lowermost conveyor, a discharge conveyor which is not being driven is not supplied with products.

16. The combination set forth in claim 9 in which said box is partitioned to define separate chambers which span a pair of discharge conveyors; said vacuum source means communicates independently with the upstream portion of each chamber; and said vacuum segregating means comprises actuable baffle means mounted in said chambers and operable to move from a position in which the upstream portion of each chamber is segregated from the vacuum source means to a position in which it is not.

17. The combination set forth in claim 9 in which said suction transfer means comprises an endless belt trained around said suction box and having tubular dependent bellows suction cups, depending therefrom to engage the products, which communicate via said opening means with the interior of said box.

18. A transfer system for a product supplying conveying means for supplying products, such as bread loaves, in a path of travel, comprising: product supplying conveying means; a plurality of longitudinally extending discharge conveyors, said discharge conveyors being generally vertically overlying, and in vertical juxtaposition with said vacuum box, and the upstream end of each, proceeding from at least the penultimate lowermost discharge conveyor to the uppermost, being successively longitudinally inset with respect to the discharge conveyor it overlies; a suction box having opening means along its bottom side extending at an upwardly inclined angle to span said discharge conveyors; a suction transfer means seletively along said side and in communication with the interior of the box through said opening means to exert suction on products; vacuum source means communicating with said box; and suction overcoming means, for selectively breaking the vacuum along portions of the length of the box adjacent said discharge conveyors and thereby selectively transferring products from said product supplying conveying means to selected discharge conveyors.

19. A transfer system for a product supplying conveying means for supplying products, such as bread loaves, in a path of travel, comprising: product supplying conveying means; a plurality of discharge conveyors, a suction box means having opening means along one side which spans said discharge conveyors; a suction transfer means traveling along said side and in communication with the interior of the box means through said opening means; vacuum source means communicating with said box means to exert suction on products; suction overcoming means, for selectively breaking the vacuum along portions of the length of the box means adjacent said discharge conveyors and thereby selectively transferring products from said product supplying conveying means to selected discharge conveyors; separate drives provided for said discharge conveyors; sensing means provided in conjunction with said discharge conveyors to determine whether product is backing up thereon; and mechanism controlled by said sensing means for operating said suction overcoming means to break said vacuum such that said suction transfer means transfers product along the length of the box means to a discharge conveyor on which product is not backed up.

20. A transfer system for a product supply conveying means for supplying products, such as bread loaves, in a path of travel, comprising: product supplying conveying means; a plurality of discharge conveyors; a suction box means having opening means along one side which spans said discharge conveyors; a suction transfer means traveling along said side and in communication with the interior of the box means through said opening means to exert suction on products; vacuum source means communicating with said box means; suction overcoming means, for selectively breaking the vacuum along portions of the length of the box means adjacent said discharge conveyors and thereby selectively transferring products from said product supplying conveying means to selected discharge conveyors; sensing means for sensing when a particular discharge conveyor is operative and requires product; individual drive means for each discharge conveyor; and means connected with said sensing means for operating said suction overcoming means to supply products to the discharge conveyors which require product in order of priority from the nearest to the product supplying means to the most remote.

* * * * *